Oct. 2, 1934.   R. G. FERRIS   1,975,316
VENTILATOR
Filed May 11, 1932    2 Sheets-Sheet 1
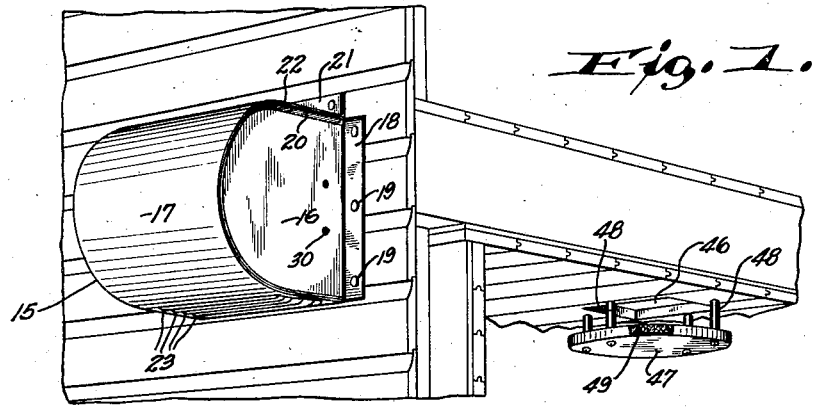
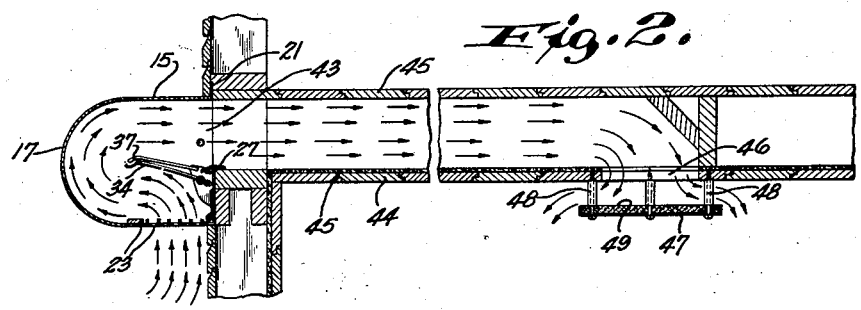
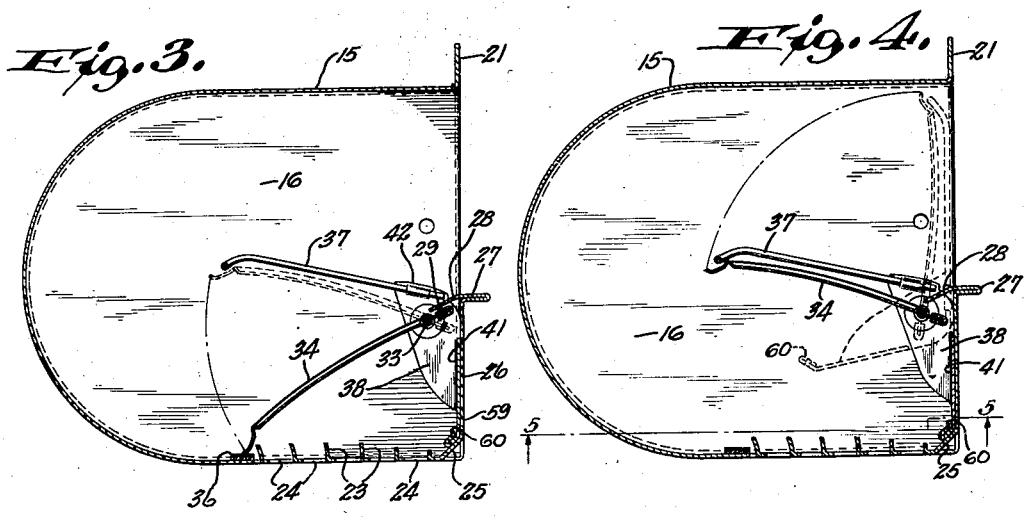
INVENTOR.
Robert G. Ferris
BY
Morsell & Morsell
ATTORNEYS.

Oct. 2, 1934.   R. G. FERRIS   1,975,316
VENTILATOR
Filed May 11, 1932   2 Sheets-Sheet 2
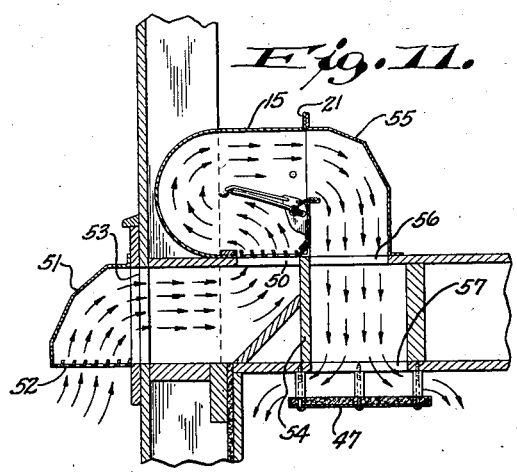
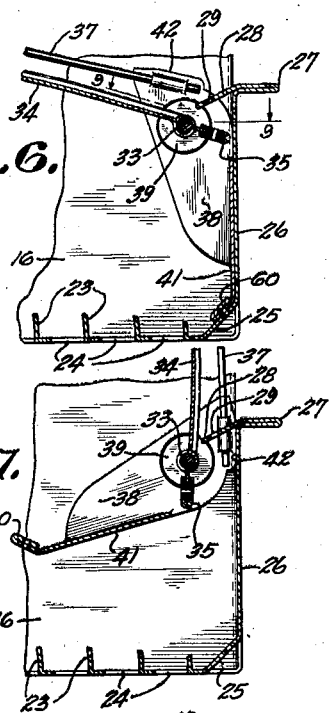
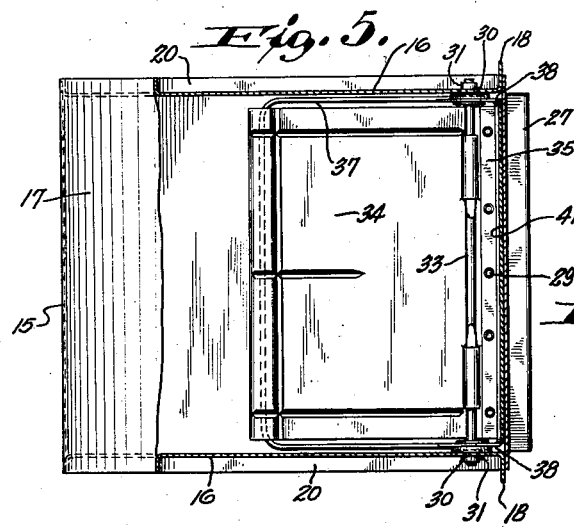
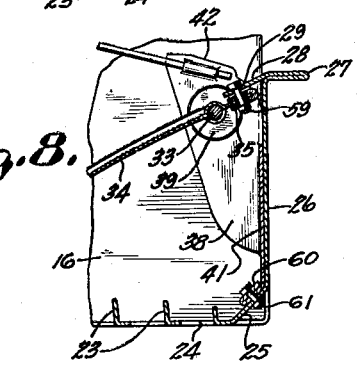
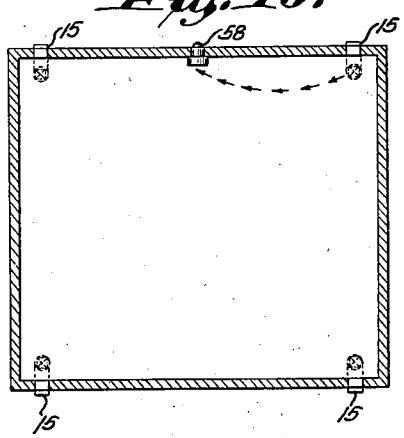
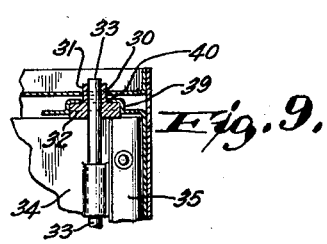
INVENTOR.
Robert G. Ferris
BY
Morsell & Morsell
ATTORNEYS.

Patented Oct. 2, 1934

1,975,316

UNITED STATES PATENT OFFICE 1,975,316

VENTILATOR

Robert G. Ferris, Harvard, Ill., assignor to Starline, Inc., Harvard, Ill., a corporation of Illinois Application May 11, 1932, Serial No. 610,619

15 Claims. (Cl. 98—37)

The present invention relates in general to ventilators, and more particularly to an improved type of air intake for use in connection with ventilating systems.

In recent years, farmers and dairymen have realized that in order to obtain the maximum milk production with the minimum of expense for feed, that cows confined in a barn must be kept at a suitable temperature, and that proper ventilation must be provided to carry off foul air and excess moisture. Ordinarily, the only source of heat within a barn is the body heat of the animals, and this heat, together with a large amount of body moisture is constantly given off to the interior of the building by the animals therein. If this heat is wasted, the laws of nature provide that more heat will be given off by the animals, and in order to generate this additional heat, more feed will naturally be consumed. It is, therefore, highly important, in order to conserve feed and in order to maintain the cows in a condition of maximum efficiency, that as little of this natural heat as possible be wasted. At the same time, however, the matter of ventilation can not be overlooked. Excess moisture in the air not only renders the cows uncomfortable and nervous, but it also causes rusting and rotting of portions of the barn and impairment of feed therein. It is, therefore, essential that this foul and moisture laden air be replaced by clean dry air from the outside. From the above, it is apparent, that an efficient barn ventilating system must be so designed as to provide for proper inflow and diffusion of fresh air, and proper outflow of foul and moist air while maintaining a desired degree of temperature within the barn.

It is well known that warm air rises and, in modern ventilating systems, it is preferably exhausted through a suitable outlet by mechanical means such as by a suction fan. When this air is exhausted, a like amount of fresh air must be admitted to replace it. The fresh air is admitted through intake openings, and as it is advantageous to employ as many intake openings as possible, there are usually a plurality of intakes for each exhaust. Sometimes, due to the proximity of an intake opening to the exhaust opening, the fresh air will be short circuited directly to the exhaust opening, and the fresh air will not therefore be properly circulated or diffused throughout the barn. Furthermore, an undue amount of air will rush in at increased velocity through this particular intake with the result that the efficiency of the other intakes more remote from the exhaust opening is impaired. Also, it frequently happens that unusual wind conditions so increase the velocity of the air entering the intakes as to cause the admission of too great an amount of cool air, and a resulting waste of the natural heat within the barn. It is therefore highly desirable, in the efficient operation of a ventilating system, that the intakes be so constructed and arranged as to each admit a substantially equal and uniform volume of air under all operating conditions, and it is important that all of this air be suitably diffused and circulated throughout all portions of the building, and that the objectionable short circuiting above mentioned be prevented. To accomplish these objects, each intake must be so constructed that its cross-sectional area is substantially constant during normal operating conditions and so that there are no points of restriction unless abnormal conditions are encountered. If such desirable features are present, the air can be controlled entirely through the intakes and a minimum amount of air will filter in through crevices and other openings of the building to upset the planned diffusion of the air.

While a number of prior devices have been utilized wherein there has been an attempt to control the air admitted through an intake, these devices are not designed to effectively insure an even flow of air through all of the intakes, and the dampers in these prior devices are so constructed that in their various positions of movement the cross sectional area of the intake is varied so that the capacity of the intake is effected. As before mentioned, this will result in an unequal admission of air through the various intakes and in improper diffusion throughout the barn.

It is, therefore, one of the objects of this invention to provide an improved intake which is provided with means for automatically maintaining, without restriction during normal operating conditions, an intake passageway of substantially uniform cross sectional area throughout its length.

A further object of this invention is to provide an intake which is adapted to automatically restrict the area of the intake passageway under certain abnormal conditions of operation.

A more specific object of the invention is to provide an intake which includes a housing shaped in a novel manner to cooperate with the damper, when the latter is in normal operating position, in providing an intake passageway of substantially uniform cross sectional area.

A further object of the invention is to provide an intake as above described wherein the housing opening is provided with louvers which are curved so as to cooperate with the shape of the housing and with the position of the damper in properly directing the admitted air.

A further object of the invention is to provide an intake wherein the exterior opening of the housing is positioned in the bottom of the latter to eliminate as much as possible the effect of wind upon the operation of the ventilating system.

A further object of the invention is to provide an intake having a movable damper therein in which an auxiliary counterweight is utilized for normally maintaining the damper in a proper position under ordinary operating conditions, the damper being movable against the force of the counter-weight only when abnormal conditions are present.

A further object of the invention is to provide an intake for ventilators wherein a novel form of bearing is employed which permits free and independent pivotal movement of both the damper and auxiliary counter-weight, and which eliminates the possibility of weather conditions interfering with proper operation of the device.

A further object of the invention is to provide an intake for ventilating systems which includes a diffusion plate located within the building, and so shaped as to provide for a uniform distribution of admitted air in all directions.

A further object of the invention is to provide an intake for ventilating systems in which means is provided for locking the movable parts in a fixed position during shipment to prevent damage thereto.

Other objects of the invention are to provide an intake of simple construction wherein the housing is constructed of but three inexpensive stamped sections, viz: two interchangeable end pieces and a continuous hood piece which forms the top, front, bottom and rear, the parts being rigidly secured to one another by spot welding or the like.

With the above and other objects in view, the invention consists of the improved ventilator and all its parts and combinations as set forth in the claims, and all equivalents thereof.

In the accompanying drawings in which the same reference numerals designate the same parts in all of the views:

Fig. 1 is a perspective view showing a broken away portion of a barn with the improved intake in connection therewith;

Fig. 2 is a fragmentary, vertical, sectional view taken through a portion of the ceiling and side wall of a barn or the like, showing the improved intake in vertical section in connection therewith;

Fig. 3 is an enlarged vertical sectional view of the intake control box or housing alone, the damper being shown by full lines in closed position, and by dotted lines in normal operating position;

Fig. 4 is a similar view showing by full lines the damper in normal operating position, and by dotted lines, in a position assumed under abnormal operating conditions;

Fig. 5 is a sectional view taken on line 5—5 of Fig. 4;

Fig. 6 is an enlarged detail view showing a portion of the device in vertical section, the damper and auxiliary counter-weight being in normal position;

Fig. 7 is a similar view showing the damper and counter-weight in an abnormal position;

Fig. 8 is a similar view showing the position of the inner part of the damper when it is in closed position;

Fig. 9 is an enlarged sectional view taken on line 9—9 of Fig. 6;

Fig. 10 is a horizontal, sectional view through a barn or the like illustrating diagrammatically one standard ventilating arrangement; and Fig. 11 is a view similar to Fig. 2 showing a modified form of installation.

Referring to the drawings, the housing or control box, designated generally by the numeral 15, consists of a pair of end members 16 and a continuous hood piece 17. The end pieces 16 are each formed with a flange 18 having attaching perforations 19 therein, and with an edge flange 20. The hood piece 17, which has one end formed with an attaching flange 21, is curved around the two end pieces in substantially U-shape, its edges being secured to the edge flanges 20 of the end members as at 22 by spot welding or in any other suitable manner. The housing may be formed of any suitable sheet metal capable of resisting weather conditions. The portion of the hood piece 17 at the bottom of the housing has louvers 23 stamped therein, there thus being a plurality of openings 24 formed between louvers through which air may be admitted to the interior of the housing. At the lower rear corner of the control box, the hood piece 17 is bent at an angle as at 25, and then vertically upwardly, as at 26, to close off the lower portion only of the rear. The upper edge of this rear portion 26 is flanged outwardly and then inwardly, as at 27, the inwardly flanged portion being continued at an angle downwardly within the housing, to form a ledge 28, which is provided with apertures 29 therein, said ledge serving to prevent short circuiting of air around the rear edge of the damper.

Near the rear of the housing, the end members 16 are provided with oppositely disposed openings 30 within which bearing members 31 are fitted. (See Fig. 9.) The bearings 31 are preferably formed of a fibrous composition material having a low heat conductivity. These bearing members are provided with a circular enlargement 32 on the interior of the housing. A pivot rod 33 has its ends journaled in the bearing members 31, and said rod carries rigidly a damper 34. The major portion of the damper projects outwardly from the pivot rod, and the short rearward projection has secured thereto a lead strip or the like 35. The strip 35 is of such weight, in relation to the position of the damper on the pivot rod, that the damper will normally assume a closing position, as shown in Fig. 3, with its outer edge resting on a strip of cushioning material 36. The damper, however, is in such a state of static balance that it will tend to open when the slightest force is exerted thereon.

A U-shaped section of wire 37 has its ends secured in the upper portion of side wings 38. Said wings are formed with circular recesses 39 (see Fig. 9), within which the enlarged portions 32 of the bearing members 31 are loosely positioned, and with openings 40 which surround the bearing portions of decreased diameter. The wings 38 are connected by a section of material 41 which extends across the rear portion 26 of the housing. The U-shaped rod 37, wings 38, and connecting section 41 form an auxiliary counter-weight. Said counter-weight is so arranged and suspended as to normally assume the position shown in Figs. 3 and 8, it being, however, freely pivotal around the bearing 32 independently of movement of the damper. The upper edge of each of the wing portions 38 has a straight part, as at 42, which forms a stop against rearward movement as indicated in Fig. 7.

In installation, an opening 43 is formed in the side wall of the barn, as shown in Fig. 2 communicating with a space between the ceiling 44 of the barn and the floor 45 of the hay mow and between joists. The control box is then secured to the exterior of the barn by means of the attaching flanges 18 and 21, with the flanged portion 27 resting on the lower edge of the opening. This flange, therefore, insures proper installation. The ceiling 44 of the barn should preferably be insulated as at 45, between joists and formed with an opening 46. A diffusion plate 47 is suitably suspended from the ceiling below and in spaced relation from the opening 46 by means of suspension members 48. The diffusion plate is preferably round as shown, and lined with insulating material 49 to prevent condensation of moisture on the plate. By having a round diffusion plate, the air descending from the opening 46 of the ceiling will be directed uniformly in all directions. If a square or rectangular plate were employed, the air would not be directed outwardly at the four corners, and thus proper diffusion would not be obtained.

In certain instances, where it is not desired to have the control box on the outside of the barn, it may be mounted in the manner shown in Fig. 11, wherein the control box 15 is mounted on the floor of the hay loft with its lower opening in registration with an opening 50 in said floor. A hood 51 is secured to the exterior of the building, and air admitted through a lower opening 52 thereof is directed through an opening 53 in the side of the building to the space below the floor of the hay loft. A cross partition 54 will direct the air in the course indicated by the arrows through the opening 50 and into the control box 15. In this form of the invention, the control box is provided with an extension 55 which is adapted to direct the air therefrom downwardly through another opening 56 in the floor of the hay loft and through an opening 57 in the ceiling of the barn to the diffusion plate.

If air is being exhausted from the building, it must be replaced by an equal amount of fresh air admitted from the intakes. In the principal form of the invention, the air will enter through the openings 24 between the louvers 23, and will cause the statically balanced damper to move from the position shown in Fig. 3 by full lines to the position shown by dotted lines therein. The air will then travel in the course designated by arrows in Fig. 2 through the openings 43 and 46 and to the diffusion plate 47. It is to be noted that when the damper is in the normal operating position of Fig. 2, that the distance between the outer edge of the damper and any part of the curved portion of the hood is substantially the same. In other words, the curved portion of the hood forms substantially a semi-circle around the outer edge of the damper as a center. The cross sectional area of the passageway taken on the radius of this semi-circle is substantially equal to the area of the lower opening of the hood. It is also to be noted that the louvers 23 and damper are so curved as to direct the entering air tangentially with respect to the curvature of the passageway and in the curved path indicated by arrows in Fig. 2 between the damper and the hood. Thus, while the damper is in normal operating position, a free path of substantially uniform cross sectional area is provided for the air from the time it enters the control box to the time it leaves. Thus, there is no restriction which will tend to prevent an even influx of air. If, because of short circuiting of air, as indicated by arrows in Fig. 10, from one of the intakes 15 directly to the exhaust outlet 58 of the barn, or if because of unusual wind conditions the velocity of the incoming air is increased, then, in order to prevent too large a volume of air from entering the barn, it is desirable to have the opening restricted. When such an increase in velocity occurs, it will overcome the weight of the counter-balancing device 37, and the damper will tend to swing upwardly, as indicated by dotted lines in Fig. 4, picking up the counter-balancing device as it swings. The width of the passageway will therefore be restricted to a degree which is inversely proportional to the velocity of the incoming air to admit substantially the same volume of air per minute as was admitted under normal operating conditions. The maximum position of movement of the damper is illustrated by dotted lines in Fig. 4, and when in this position a slight space is left above and on each side of the damper through which air can be admitted to the building. This eliminates any absolute sealing of the intake opening which would be undesirable, as a negative pressure would be built up within the barn and would prevent operation of the system.

If unusual conditions within the barn cause a back draft, which would tend to waste the warm air within, this will cause a complete closing of the damper as shown in full lines in Fig. 3, and the damper will remain closed until the back draft has been corrected.

By having a control box which can be mounted either entirely outside of the barn, as in Fig. 1, or entirely within, as in Fig. 11, the temperature thereof will be substantially uniform, and there will be therefore no tendency for condensation to form on parts thereof due to temperature differences, and therefore no necessity for insulation of portions of the control box. Due to the use of fibrous bearings, freezing of the bearings for the pivot rod of the damper and for the auxiliary counter-weight is prevented.

It may be seen that the control box, which consists merely of the two interchangeable end pieces 16, the continuous hood piece 17, and the damper and counter-weight can be readily manufactured at a minimum of expense. In shipment, the inner edge of the damper, which is provided with perforations, may be secured by nuts and bolts 59 to the angular ledge 28 in the position shown in Fig. 8, said ledge having the alined perforations 29. The lower edge 60 of the auxiliary counter-weight may also be secured to the angular corner portion 25 of the housing, registering apertures being formed in the two parts for the reception of bolts 61 as shown in Fig. 8. Thus, the parts can be maintained in a rigid position during shipment, and damage will be prevented without expensive packing.

The peculiar shape of the hood and the position of the inlet opening in the lower part thereof are important, as they prevent wind from unduly influencing the operation of the system. Eddy currents are set up around the housing which allow the air to be drawn into the housing from a neutral pressure area. The rear discharge opening of the hood has been constructed of such size that it will just fit the minimum opening which is formed between the joists in a barn. The minimum spacing between joists is usually thirteen inches and the height of the space is seven and one-half inches. For this reason the rear opening has been constructed with these dimensions so that an accurate fit will be possible as shown in Fig. 2 and so that the discharge opening will be as large as possible. The remainder of the device previously described in detail is so constructed as to provide the most compact arrangement possible while still maintaining a passageway from the inlet to the outlet which is substantially equal in area to the area of the discharge opening and to the area of the minimum space between joists in a barn.

In view of the above, it may be seen that an intake has been provided which is constructed to admit a uniform amount of air under all conditions of operation so that all of the intakes will function uniformly to cause proper diffusion, and so that only the desired amount of fresh air will be admitted in automatically controlled amounts sufficient to just replace the amount of foul and moisture laden air exhausted from the barn. It may also be seen that unusual amounts of fresh air which would cause an undesirable lowering of the temperature within, will not be admitted.

Although only two forms of the invention have been shown and described, it is obvious that various changes and modifications may be made without departing from the spirit of the invention, and all such changes are contemplated as may come within the scope of the claims.

What I claim is:

1. A ventilator intake comprising a housing having a bottom inlet opening, a regulator pivotally mounted within the housing, the pivotal mounting being spaced above the inlet opening and being so disposed that the regulator is movable from an angular closing position with respect to said inlet opening to a normal operating position wherein the regulator is disposed in a plane above the inlet opening and wherein its front edge is spaced from the front of the housing, said housing also having a discharge opening positioned to compel air within the housing to pass around the front edge of the regulator.

2. A ventilator intake comprising a housing having a bottom inlet opening, a regulator pivotally mounted within the housing, the pivotal mounting being spaced above the inlet opening and being so disposed that the regulator is movable from an angular closing position with respect to said inlet opening to a normal operating position wherein the regulator is disposed in a plane above the inlet opening and wherein its front edge is spaced from the front of the housing, said housing also having a discharge opening positioned to compel air within the housing to pass around the front edge of the regulator, and means operable to permit movement of the regulator past normal operating position only when abnormal air conditions are present.

3. A ventilator intake comprising a housing having a bottom inlet opening, a regulator pivotally mounted within the housing, the pivotal mounting being spaced above the inlet opening and being so disposed that the regulator is movable from an angular closing position with respect to said inlet opening to a normal operating position wherein the regulator is disposed in a plane above the inlet opening and wherein its front edge is spaced from the front of the housing, said housing also having a discharge opening positioned to compel air within the housing to pass around the front edge of the regulator, the front of the housing being uniformly curved from a point near the inlet opening to the top of the housing.

4. A ventilator intake comprising a housing having a bottom inlet opening and having a rear discharge opening, a regulator pivotally mounted adjacent its rear edge within the housing, said pivotal mounting being adjacent the bottom of the discharge opening and spaced above the inlet opening, and further being so disposed that the regulator is movable from a closing position with respect to the inlet opening to a substantially horizontal normal operating position wherein the front of the housing is spaced from the front edge of the regulator to provide for the circulation of air upwardly through the inlet opening, around the front edge of the regulator, and then in a reverse direction above the regulator to the discharge opening.

5. A ventilator intake comprising a housing having an inlet opening and a discharge opening, a regulator pivotally mounted adjacent its rear end near a wall of the housing and movable from a closing position with respect to said inlet opening to a normal operating position, counterbalanced means pivotally mounted within the housing and having a part normally positioned to be engaged by the forward portion of the regulator to prevent movement of the latter past normal operating position and also having a portion at an angle to said first portion which is engageable with the adjacent wall of the housing to prevent movement of the counter-balanced means in one direction, said counter-balanced means being movable in the other direction to permit further movement of the regulator only when abnormal air conditions are present.

6. A ventilator intake comprising a housing having an inlet opening and a discharge opening and having a substantially vertical wall, a regulator pivotally mounted adjacent its rear end near said vertical wall and movable from a closing position with respect to said inlet opening to a normal operating position, counter-balanced means pivotally mounted within the housing adjacent the pivotal mounting for the regulator and having a part normally positioned in a substantially horizontal plane for engagement by the forward portion of the regulator to prevent movement of the latter past normal operating position, said counter-balanced means having another part normally positioned in a substantially vertical plane and in engagement with the vertical wall of the housing, said counter-balanced means being movable upwardly to permit further movement of the regulator only when abnormal air conditions are present.

7. A ventilator intake comprising a housing having an inlet opening and a discharge opening, a regulator pivotally mounted adjacent its rear end within the housing and movable from a closing position with respect to said inlet opening to a normal operating position, counter-balanced means within the housing having a substantially U-shaped frame positioned to be engaged by the forward portion of the regulator to prevent movement of the latter past normal operating position, and pivotally mounted wings in connection with the ends of said U-shaped frame engageable with the housing to normally maintain said counter-balanced means in normal operating position.

8. A ventilator intake comprising a housing having an inlet opening and a discharge opening, opposite portions of said housing having bearings in connection therewith, a rod journalled in said bearings, a damper fixed to said rod, said damper being movable from a closing position with respect to said inlet opening to a normal operating position intermediate the walls of the housing to form with said walls a free passageway from the inlet opening to the discharge opening, counter-balancing mechanism having portions partially surrounding the exterior periphery of said bearings, said counter-balancing mechanism being cooperable with the damper to normally prevent movement of the latter past normal operating position, said counter-balancing mechanism being movable to permit further movement of the regulator only when abnormal air conditions are present.

9. A ventilator intake comprising a housing having a curved wall and having an inlet opening provided with louvers and a discharge opening, a regulator mounted in the housing and movable in response to normal air conditions from a closing position with respect to the inlet opening to a normal operating position intermediate the housing wherein it forms with the walls of the housing a substantially U-shaped passageway leading from the inlet opening to the discharge opening, said louvers of the inlet opening and the regulator being curved to cooperate with one another to direct admitted air tangentially to the curvature of the passageway and the curved wall of the housing then directing the air in a reverse direction coinciding with the curvature of the passageway.

10. A ventilator intake comprising a housing having an inlet opening and a rear discharge opening, a regulator pivotally mounted adjacent its rear end near the rear of the housing and adjacent the lower portion of the discharge opening, said regulator being movable from a closing position with respect to the inlet opening to a normal operating position wherein it forms with the walls of the housing a passageway leading from the inlet opening to the discharge opening, and means extending inwardly from the discharge opening and at an angle thereto for preventing short circuiting of air around the rear end of the regulator.

11. A ventilator intake comprising a housing having an inlet opening and a rear discharge opening, a regulator pivotally mounted adjacent its rear end near the rear of the housing and adjacent the lower portion of the discharge opening, said regulator being movable from a closing position with respect to the inlet opening to a normal operating position wherein it forms with the walls of the housing a passageway leading from the inlet opening to the discharge opening, and the wall of the housing below the discharge opening having its edge flanged outwardly and then inwardly, said outwardly flanged portion serving to cause proper registration of the discharge opening with an opening of a building in installation and said inwardly flanged portion overlapping the rear end of the regulator and preventing short circuiting of air around the rear end of the regulator.

12. A ventilator intake comprising a housing having an inlet opening and a discharge opening, a regulator pivotally mounted adjacent its rear end within the housing and movable from a closing position with respect to said inlet opening to a normal operating position, counter-balanced means pivotally mounted within the housing and having a part normally positioned to be engaged by the forward portion of the regulator to prevent movement of the latter past normal operating position, said counter-balanced means being movable to permit further movement of the regulator only when abnormal air conditions are present, and means in connection with said counter-balanced means engageable with the housing for positively limiting the extent of movement in both directions of the counter-balanced means.

13. A ventilator intake comprising a housing having an inlet opening and a discharge opening, opposite portions of said housing having fiber bearings therein, a rod journaled in said fiber bearings, a damper fixed to said rod, said damper being movable from a closing position with respect to said inlet opening to a normal operating position intermediate the walls of the housing to form with said walls a free passageway from the inlet opening to the discharge opening, counter-balancing mechanism having portions pivotally surrounding the exterior periphery of said fiber bearings, said counter-balancing mechanism being cooperable with the damper to normally prevent movement of the latter past normal operating position, said counter-balancing mechanism being movable to permit further movement of the regulator only when abnormal air conditions are present.

14. A ventilator intake comprising a housing having an inlet opening, and a regulator movably mounted within said housing and having apertures formed in a portion thereof, a portion of the housing having apertures therein which are registrable with the apertures of the regulator to provide for securing of the regulator against movement during shipment and while it is in assembled position.

15. A ventilator intake comprising a housing having an inlet opening, a regulator movably mounted within said housing and having apertures formed in a portion thereof, and counter-balancing mechanism movably mounted within said housing and having apertures formed in a portion thereof, a portion of the housing having apertures therein which are registrable with the apertures of the regulator and another portion of the housing having apertures which are registrable with the apertures of the counter-balancing mechanism to provide for securing of the regulator and counter-balancing mechanism against movement during shipment and while they are in assembled position.

ROBERT G. FERRIS.